F. J. BAKER.
DIFFERENTIAL GEARING.
APPLICATION FILED MAR. 12, 1918.
1,296,256.
Patented Mar. 4, 1919.
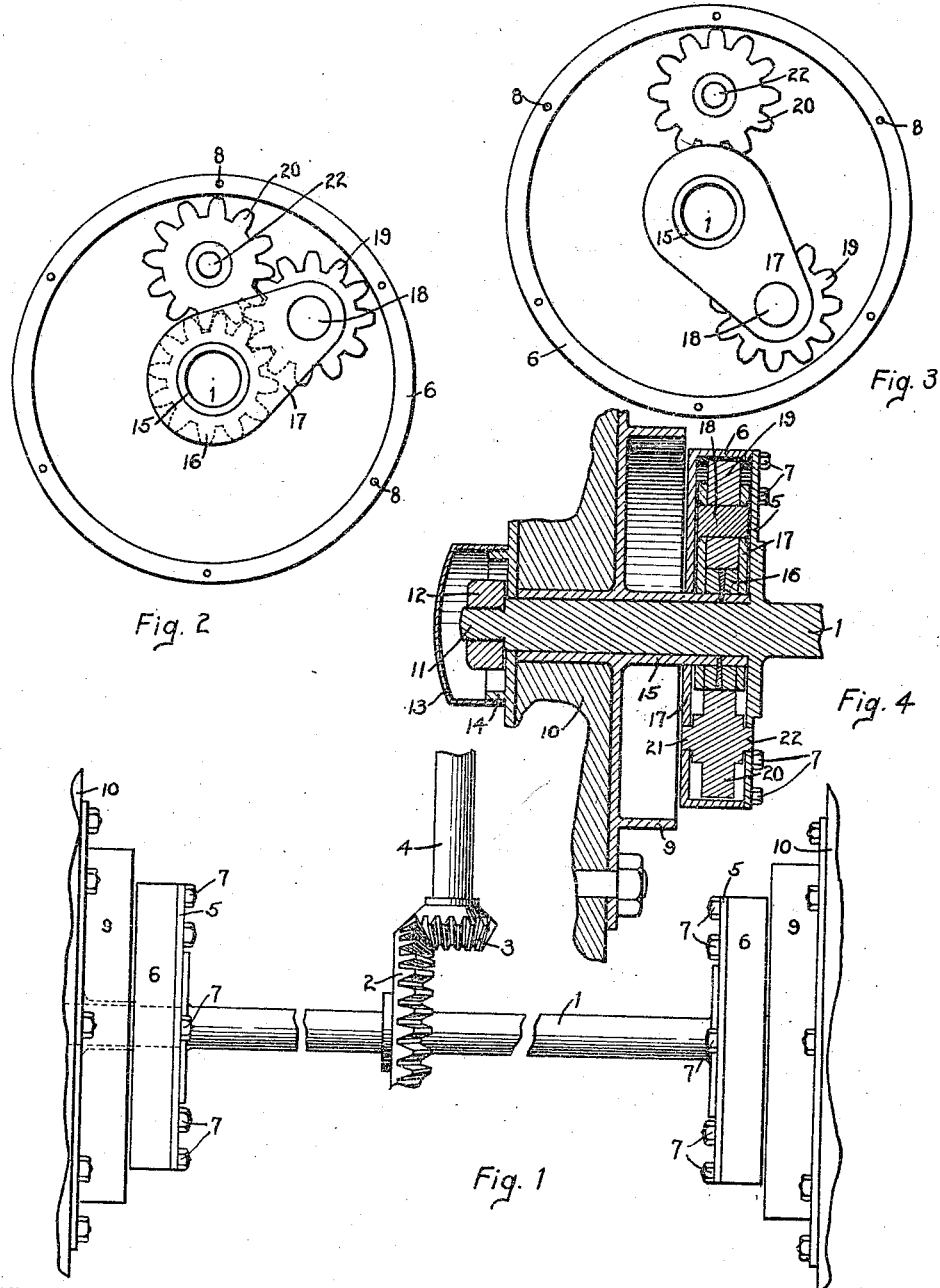

UNITED STATES PATENT OFFICE.

FREDERICK J. BAKER, OF DAYTON, OHIO.

DIFFERENTIAL GEARING.

1,296,256.  Specification of Letters Patent.  Patented Mar. 4, 1919.

Application filed March 12, 1918. Serial No. 222,024.

*To all whom it may concern:*

Be it known that I, FREDERICK J. BAKER, a citizen of the United States, residing at Dayton, in the county of Montgomery and State of Ohio, have invented certain new and useful Improvements in Differential Gearing, of which the following is a specification.

This invention relates to new and useful improvements in differential gearing.

The principal object of the invention is to provide a solid axle differential for automobiles, tractors and trucks. This not only enables the driving axle to be strengthened at its middle portion, but takes from it a cumbersome housing which frequently bumps into the rear springs or body of the car, with injury to the latter, when the automobile encounters a rough place in the road.

My improved differential gearing is admirably adapted to be driven by a vertical shaft connected either directly or indirectly to the engine. This feature well fits it for a front wheel drive on fire department and other heavy trucks.

A straight axle that may be strengthened by enlargement or other form of reinforcement at its middle portion, is one of the great advantages which my invention offers, making it particularly useful on low speed trucks where a driven axle of great strength is usually required.

My invention contemplates the provision of a solid axle that has a differential housing at each end for the rotation of a respective traction wheel. In each housing there is one of my improved differential mechanisms to be hereinafter described.

The preferred form of embodiment of my invention is illustrated in the accompanying drawings, of which Figure 1 is a rear elevational view of a driving axle equipped with my improved differential gearing. Fig. 2 is a plan view of one of the differential housings, with the cover plate removed to reveal the differential gears in driving engagement. Fig. 3 is a plan view of said housing, showing the position of the gears when the housing which contains them is rotating at a slower rate than the wheel to which it belongs. And Fig. 4 is a sectional view, partly broken away, through one of the differential housings and the hub of its respective traction wheel.

Throughout the specification and drawings, similar reference characters denote corresponding parts.

In a detailed description of the preferred form of embodiment of my invention, the numeral 1 designates an automobile axle to the middle portion of which a bevel gear 2 is fixedly secured. This gear is in mesh with a bevel gear 3 fast on the lower end of a vertical driving shaft 4. While I have shown a vertical drive for the differential now to be described, it may be equally as well operated by a driving shaft of the horizontal or inclined type.

Secured integrally or otherwise to each end of the shaft 1 is a cover plate 5 of a drum-shaped differential housing 6. Arranged around the periphery of the cover plate 5 are bolts 7 adapted to be screwed into axial holes 8 in the wall of each housing 6 to firmly, yet removably, secure a respective cover plate thereon. (See Figs. 2 and 3.)

Referring to Fig. 4, the axle 1 extends through the central portion of each housing 6, a brake drum 9 and the hub 10 of a traction wheel belonging to said housing, terminating in a threaded end 11 adapted to receive a nut 12. Preferably inclosing the nut 12 is a terminal cap 13 which screws on an annular boss 14 on the face of the hub 10. The hub 10 and brake drum 9 are fast on a sleeve 15 that loosely slides onto the axle 1 and extends into the housing 6 belonging to its respective end of the axle, said housing adapted to freely rotate around the sleeve. Fast on each sleeve 15 within its respective housing 6, is a gear 16. Also loosely mounted on the sleeve 15, one on each side of the gear 16 within each housing 6, are two parallel radial arms 17. Secured between the outer ends of each pair of arms 17 is a pivot 18 upon which an idle pinion 19 is loosely mounted. (See Figs. 2, 3 and 4.)

The pinion 19 is adapted to be engaged by a gear 20 which has a projecting axial portion 21 adapted to loosely enter a hole in the rear wall of its respective housing 6, and a front projecting axial portion 22 adapted to loosely enter a hole provided in the cover plate 5 of said housing. Accordingly, when the housing 6 is rotated, the gear 20 will be carried around by it for the following purpose.

The straight axle 1 receives its driving power from the vertical shaft 4 through the bevel gears 2 and 3. As the axle 1 is turned, it will rotate the cover plates 5 to which the differential housings 6 are bolted. The rotation of the housings 6 in turn carries the gears 20 into mesh with the idle pinions 19 carried by the arms 17 loose on the sleeves 15. When the machine is traveling a straight course, both of the gears 20 will so lock with their respective idle pinions 19 and gears 16, as shown in Fig. 2, that the rotation of the axle 1 will turn the sleeves 15 on which the hubs 10 of the driving wheels are fast, to propel the automobile in a forward or reverse direction.

Now, when the machine starts to turn a corner for example, one driving wheel will rotate at a slower rate of speed than the other one. Under such circumstances, the gears and pinion in the housing 6 belonging to the slower moving wheel will still remain in the locked position shown in Fig. 2, for propulsion by the driving shaft 4. However, in the case of the faster moving wheel, the sleeve 15 secured thereto will rotate at a faster rate than the axle 1, which will cause the idle pinion 19 controlled by that sleeve to be carried by the arms 17 out of engagement with its respective gear 20. Therefore, as the axle 1 continues to turn at a slower rate of speed than the sleeve 15 to which the faster moving wheel is secured, the gear 20, being loosely pivoted within its housing 6, will idly rotate as it is carried around its respective gear 16 by said housing, with its respective pinion 19 in advance and out of engagement with it as shown in Fig. 3. Ordinarily there it not enough difference in speed between the two wheels to bring the faster moving pinion 19 around to the point where it will engage its respective gear 20 from the other direction to lock the gears at a time when one wheel is moving faster than the other one.

After the machine has turned the corner, the faster moving wheel will slow down to the rate of the slower moving one, whereupon the rate of rotation of the sleeve 15 will decrease to that of its respective housing 6. The gear 20 which is carried by the latter housing, will therefore catch up with its respective idle pinion 19 carried by the arms 17 loose on the sleeve 15, reëngaging it and thereby bringing about the locked position of the gears and pinion shown in Fig. 2, to turn the sleeve 15, and through it the wheel which was the faster moving one, at the same rate of speed as the other wheel.

It will thus be seen that as soon as one traction wheel becomes the faster moving one, its respective idle pinion 19 will be carried by the arms 17 on its respective sleeve 15, away from the gear 20 revolved by its respective housing 6, which, being secured to the axle 1, will rotate at a slower rate than said sleeve 15 to which the hub 10 of the faster moving wheel is secured. In other words, the sleeve 15 which travels faster than the axle 1, will carry its respective pinion 19 out of engagement with the gear 20 of its respective housing 6, since the gear 20 is revolved by the axle and the pinion 19 is carried by the arms 17.

A straight axle differential is thus provided, which is efficient in operation, strong in construction and adapted for use with a vertical or any other form of drive.

Having described my invention, I claim:

1. In a differential gearing, the combination with a solid axle, means for turning said axle, a rotatable sleeve on each end of the latter, a traction wheel fixedly secured to the outer end of each sleeve, a differential housing fast on each end of said axle to receive a respective sleeve, radial means loosely mounted on each sleeve within its respective housing, for independent revolution within the latter, and means carried by each housing to engage the radial means on its respective sleeve, to rotate the latter until it is turned by its respective traction wheel at a faster rate of speed than the axle.

2. In a differential gearing, the combination with a solid axle, means for turning said axle, a rotatable sleeve on each end of the latter, a traction wheel fixedly secured to the outer end of each sleeve, a differential housing fast on each end of said axle to receive a respective sleeve, a gear fast on each sleeve within its respective housing, radial arms, one on each side of said gear, loosely mounted on said sleeve within said housing and adapted to revolve independently of the latter, an idle pinion pivotally secured between each pair of radial arms, a second gear pivotally mounted within each housing in engagement with the first gear, and adapted to be carried by the housing into engagement with the idle pinion until the latter is carried around the axle by its respective sleeve at a greater rate of speed than the housing which contains it.

3. In a differential gearing, the combination with a solid axle, driving means operatively connected to the middle portion of said axle, a rotatable sleeve on each end of the latter, a traction wheel fixedly secured to the outer end of each sleeve, a differential housing fast on each end of said axle to receive a respective sleeve, radial arms, one on each side of said gear, loosely mounted on said sleeve within said housing and adapted to revolve independently of the latter, an idle pinion pivotally secured between each pair of radial arms, and in engagement with the first gear, a second gear pivotally secured to the walls of each housing for engagement with the first gear, and adapted to be carried by the housing into engagement with the idle pinion to lock with the latter and the first gear for the purpose of rotating the sleeve and the traction wheel secured to it until said wheel starts to rotate at a faster rate than the other wheel, whereupon the idle pinion carried by the arms 17 of the sleeve of the faster moving wheel will be moved ahead of, and out of engagement with, its respective second gear.

In testimony whereof I have hereunto set my hand this 9th day of March, 1918.

FREDERICK J. BAKER.

Witness:
WILLIAM B. HOUNELL.

Copies of this patent may be obtained for five cents each, by addressing the "Commissioner of Patents, Washington, D. C."